May 10, 1966 P. D. KING 3,251,042
DIGITAL COMPUTER
Filed June 14, 1962
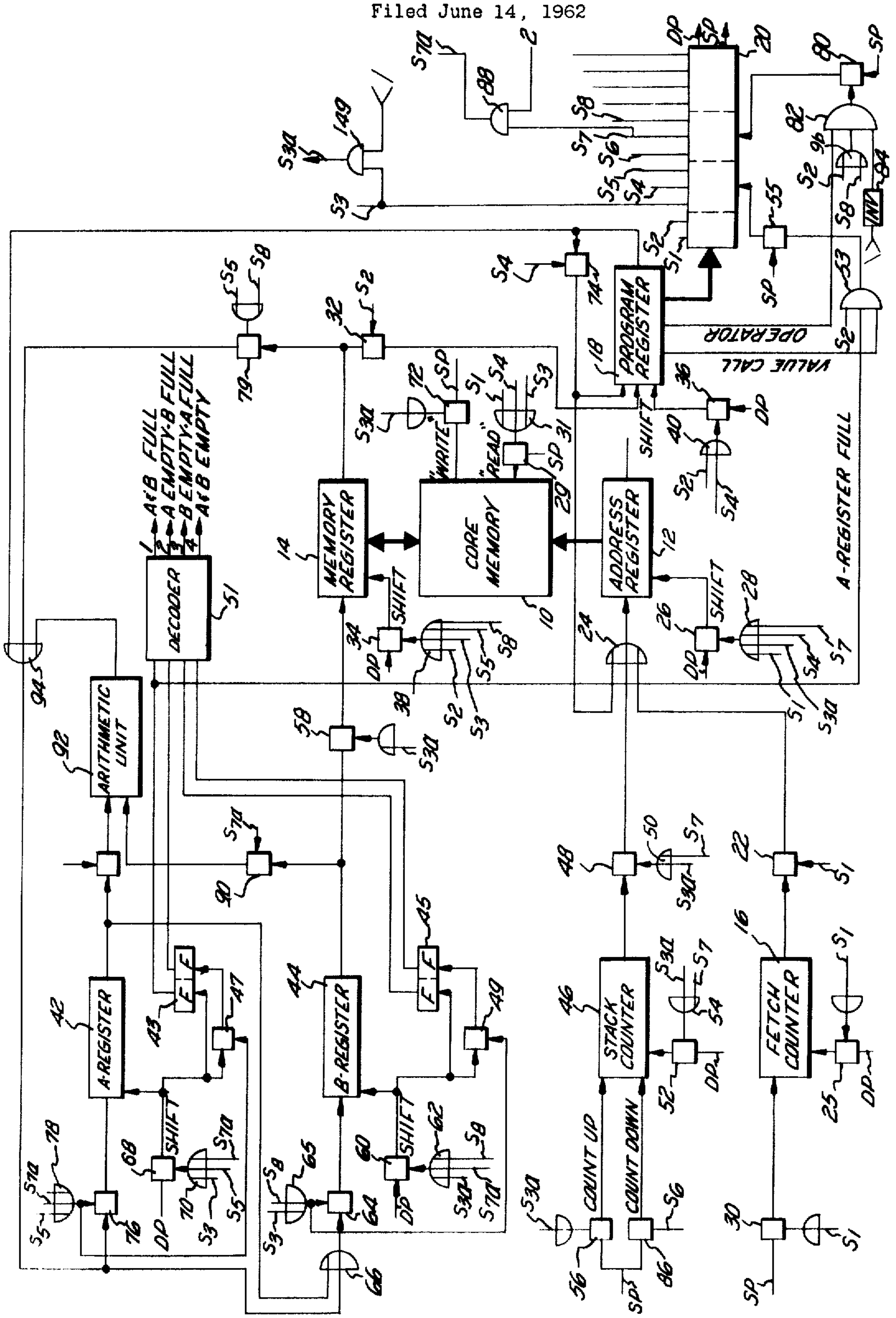

United States Patent Office 3,251,042

Patented May 10, 1966

3,251,042
DIGITAL COMPUTER

Paul D. King, Pasadena, Calif., assignor to Burroughs Corporation, Detroit, Mich., a corporation of Michigan

Filed June 14, 1962, Ser. No. 202,509
9 Claims. (Cl. 340—172.5)

This invention relates to electronic digital computers, and more particularly is concerned with an improved control arrangement for a computer using a temporary storage for operands.

In co-pending application Serial No. 84,156, filed January 23, 1961, in the names of Paul D. King and Robert S. Barton, and assigned to the assignee of the present invention, there is described a novel computer which is arranged to operate on a string of program control syllables rather than on conventional single-address or multiple-address instructions. The program syllables may be either of a type to initiate an operation or of a type to address information in the main memory of the computer. In order to eliminate the need for addresses associated with each operation, as is necessary in more conventional electronic computers of the single-address or multi-address type, all operands, as they are called out from main memory, are placed in a temporary storage facility, referred to as a "stack." The temporary storage facility is called a stack because it is arranged to store and read out operands on a last in-first out basis, i.e., the operands may be considered as stacked in the temporary storage with operands being available from the top of the stack in the reverse order in which they were placed in the stack. Arithmetic operations are always performed on the last two operands to be placed in the stack and the result of an arithmetic operation is returned to the top of the stack.

In order that arithmetic operations can be performed on the two operands last placed in the stack, it is desirable that the "top" two positions in the stack be a pair of registers. All other positions in the stack may be in a portion of conventional random access memory device which is addressed by a counter. The counter is counted up or down as new operands are added to or removed from the top of the stack. Since the top two positions of the stack are always the two registers, it is necessary that operands actually be transferred from one register to the other when an operand is added to or removed from the stack.

Since an arithmetic operation normally requires that both registers forming the top two positions of the stack be full in order to perform the operation, heretofore the stack was operated so that there was an automatic adjustment at the end of any operation to insure that the registers were both full before the next program syllable was executed. However, where the next syllable in the program string calls for a unary operation or calls for an operand to be placed in the stack, it is not necessary that both registers be full. In such case, operating time is wasted in always doing an automatic adjustment of the stack to maintain there registers full at all times.

The present invention is directed to an improvement in such a computer using the "stack" temporary storage concept described in the above-mentioned co-pending application. According to the present invention, each of the two registers forming the top two positions of the stack has associated therewith an Occupancy flip-flop which is set "on" whenever the corresponding register is storing usable information. The flip-flop is reset to "off" whenever the associated register is to be considered as empty. The Occupancy flip-flops do not actually determine whether or not the associated registers have digits stored therein, but rather provide an indication of whether the information stored in the associated registers is usable in a subsequent operation. For example, a register may contain all zeros, but the Occupancy flip-flop may be on, indicating that the zeros represent usable information. On the other hand, a group of digits from a previous operation may still be in the register, but the Occupancy flip-flop may be off, indicating that the register is to be treated as being empty of usable information.

The Occupancy flip-flops are useful in the control logic of the computer to determine at any time the condition of the two registers forming the top of the stack. The Occupancy flip-flops in combination with the stack counter provide a means of determining logically where effectively the top of the stack is at any given moment in terms of the last operand to be placed in the stack.

In brief, the present invention provides an improved control apparatus for a computer having a temporary storage facility including a pair of registers and an addressable memory device and wherein operations are performed on the contents of the registers with the result of such operations being stored in one of the registers. The control apparatus includes a first flip-flop associated with a first one of the two registers and a second flip-flop associated with a second one of the two registers. Means is provided for setting the first flip-flop to a one stable state in response to the transfer of a word into the first register and setting the flip-flop to the other state in response to the transfer of a word out of the first register. Similar means is provided for setting the second flip-flop to one stable state in response to the transfer of a word into the second register and setting the flip-flop to the other state in response to the transfer of a word out of the second register. At the start of any operation, means responsive to the two flip-flops provides for automatic filling of the registers from the memory device. The control means is associated with the memory device for insuring that the registers are always automatically filled by the last two words in a sequence of words stored in the memory device.

For a more complete understanding of the invention, reference should be made to the accompanying drawing wherein the single figure is a block diagram of one embodiment of the present invention.

The present invention is particularly useful in connection with a digital computer of the type described in the above co-pending application, although not limited to such. As mentioned above, the co-pending application describes a computer in which program syllables are arranged to be executed in sequence, each syllable being arranged to either call forth operands from memory into the stack or to initiate specified arithmetical or logical operations on the last one or last two operands placed in the stack. The latter type of syllable is called an Operator syllable and initiates operations such as an addition, a subtraction, or the like. The syllables used in placing operands in the stack are called Value Call syllables. While other syllables are normally provided, they are not necessary to the understanding of the present invention and so will not be discussed. Since any member of Operand syllables can be executed in sequence or any number of Value Call syllables can be executed in sequence, the situation arises that before any syllable can be executed, the condition of the registers in the stack must be known.

Referring now to the drawing in detail, the numeral 10 indicates generally a random access memory, such as a magnetic core memory, in which binary coded words are stored in addressable memory locations. The memory locations are selected by binary coded addresses stored in an Address register 12. Binary coded information words are transferred into and out of specified memory locations in the core memory 10 through an input/output Memory register 14. Transfer is from a specified memory location to the register 14 or from the register 14 to the specified address location and is initiated by a pulse on one or the other of two inputs, designated respectively the "Write" input and the "Read" input. Addressable core memories of this type are well known in the computer art. See, for example, the book "Digital Computer Components and Circuits" by R. K. Richards, D. van Nostrand Company, 1957, chapter 8.

A portion of the core memory 10 is allocated to the storage of the program syllables, which are stored in consecutive memory locations and are fetched from memory in consecutive order by means of a Fetch counter 16. The counter 16 is initially set to a value corresponding to the address location of the first program syllable in memory and then is caused to be counted up one each time a program syllable is transferred out of memory. Each time a program syllable is to be transferred out of the core memory, the contents of the Fetch counter 16 are transferred to the Address register 12. It should be noted that since serial operation is assumed throughout in which words are transferred character by character between registers, the counter 16 is also arranged as a shift register so that its contents can be shifted serially into the register 12. However, it should be understood that while serial operation is given by way of example, the invention is equally applicable to parallel operation.

Each program syllable read out of the core memory 10 is transferred from the Memory register 14 to a Program register 18. It is while in the Program register 18 that the syllable is decoded to detemine which type of syllable it is so that the computer can be controlled accordingly.

A central control unit 20 functions to cause the individual units of the computer to perform in such a manner that program syllables are fetched in the proper sequence, decoded and executed as required. A suitable control unit is described in detail in copending application Serial No. 788,823, filed January 26, 1959, in the name of Edward L. Glaser and assigned to the assignee of the present invention. The central control unit 20 includes a counter (not shown) arranged to be stepped through a succession of states, to be set to any selected state, or be reset. Only eight states are shown in the figure, designated $S_1$ through $S_8$, since these are the only states required to carry out the particular functions with which the present invention is directly related. The central control unit 20 is further arranged to generate a predetermined number of digit pulses, designated DP's, while in each state, each group of DP's being followed by one step pulse, designated SP. The generation of the SP normally causes the counter of the central control unit to advance to the next state unless the counter is set by associated gating circuitry to some other state.

The $S_1$ and $S_2$ states of the central control unit are common to all syllable executions and are used to control the fetch operation of the next syllable in the core memory. To this end, the $S_1$ state is applied to a gate 22 on the output of the Fetch counter 16, permitting transfer of the contents of the Fetch counter 16 through a "logical or" circuit 24 into the Address register 12. The $S_1$ state also opens a gate 25, permitting DP's to be applied to the shift input of the Fetch counter 16, the number of DP's generated during the $S_1$ state being just sufficient to transfer a complete word from the Fetch counter 16 to the Address register 12. DP's are also applied through a gate 26 to the shift input of the Address register 12 in response to the $S_1$ level applied to the gate 26 through a "logical or" circuit 28. After the required number of DP's are generated to shift the contents of the register 16 into the Address register 12, the following SP sets the central control unit to the $S_2$ state.

The same SP generated at the end of the $S_1$ state is also applied to the "Read" input of the core memory 10 by means of a gate 29 which is biased open by the $S_1$ level applied through a "logical or" circuit 31. As a result, the addressed word in the core memory 10 is read into the Memory register 14 at the end of the $S_1$ state. At the same time, the SP is used to count up the Fetch counter 16 by applying it to a gate 30 which is open during the $S_1$ state. In this way, the Fetch counter is advanced to the address location of the next program syllable in the program string stored in the memory.

During the $S_2$ state, the gate 32 is open, permitting transfer of the program syllable from the Memory register 14 to the Program register 18. DP's are applied to the shift inputs of the two registers through gates 34 and 36 respectively. The high level of the $S_2$ state is applied to these respective gates through "logical or" circuits 38 and 40 respectively. In this way, a program syllable is transferred into the Program register 18.

In the particular embodiment shown in the drawing, the stack memory includes a portion of the core memory 10 designated by a Stack counter 46. In addition, the stack consists of an A-register 42, that normally forms the top of the stack into which operands are transferred when placed in the stack, and a B-register 44, that represents the storage position immediately below the top of the stack into which operands from the A-register are transferred when another operand is added to the stack. Normally, an operand is placed in the top of the stack by inserting it in the A-register 42. The operand is moved down in the stack by transferring it from the A-register 42 to the B-register 44 and from the B-register into the memory location in the core memory 10 designed by the Stack counter 46. Each time an operand is placed in the stack portion of the core memory 10 from the B-register 44, the Stack counter 46 is counted up one. Whenever an operand is removed from the core memory 10 to the B-register, the Stack counter is first counted down one so that it corresponds to the location of the last operand to be placed in the stack portion of the core memory. In this way, the stack portion of the core memory is always addressed on the basis of the last operand in being the first operand out.

When a Value Call syllable is encountered, calling for an operand to be inserted in the top of the stack, unless the A-register 42 is empty, the contents of the stack must in effect be moved down. In accordance with the present invention, an Occupancy flip-flop 43 is associated with the A-register 42. Similarly, an Occupancy flip-flop 45 is associated with the B-register 44. These Occupancy flip-flops, in a manner hereinafter to be described, provide an indication of whether or not the associated register contains useful information. Since the syllable types can come in any sequence, the Occupancy flip-flops 43 and 45 provide a means of sensing the condition of the A and B-registers at the start of the execution of each syllable on the program string. For example, at the end of the execution of a syllable, it is possible for the A-register 42 either to contain or not contain useful information. Likewise, it is possible for the B-register 44 to contain or not contain useful information. If the next syllable in the string encountered is an Add operator, for example, both the A-register and B-register must be filled with useful information before the add operation can take place. If they are not full, and adjustment of the stack is required to load these two registers. On the other hand, if a Value Call syllable is encountered, the A-register 42 must be empty so as to receive the new operand to be added to the stack. If the A-register 42 is not empty, an adjustment of the stack is required. The Occupancy flip-flops are taken into account at the start of the execution of each syllable to determine if the stack is in proper condition to execute the syllable.

While various means may be provided for setting the Occupancy flip-flops, one way, which is shown by way of example only, is to set each flip-flop from the shift pulses applied to the associated register. Shift pulses are applied to the "off" side of each of the Occupancy flip-flips 43 and 45 so that whenever a word is being shifted out of the respective registers, the Occupancy flip-flops are automatically set to their "off" condition. Shifting pluses are also applied to the "on" side of the Occupancy flip-flops 43 and 45 through gates 47 and 49 respectively. These gates are biased open whenever a word is being transferred into the respective registers. Since the gates 47 and 49 introduce an inherent delay, when these gates are open, the Occupancy flip-flops 43 and 45 are left in their "on" condition by the last shift pulse applied to the respective registers.

Continuing now with the assumption that a Value Call syllable has been placed in the Program register 18, before an operand can be transferred from the main memory into the stack by way of placing it in the A-register 42, a determination must first be made, using the Occupancy flip-flops 43 and 45, as to the condition of the stack. To this end, the output of the Occupancy flip-flops 43 and 45 are applied to a decoding circuit 51 having four output lines designated 1 through 4. If both the flip-flops 43 and 45 are "on," indicating that the registers 42 and 44 are both full, a signal in the form of a D.C. level is derived from the output 1 of the decoder 51. If both flip-flops are "off," a signal is derived from the output 4 of the decoder 51. The output 2 of the decoder 51 indicates that the flip-flop 43 is off and the flip-flop 45 is on, and output 3 of the decoder 51 indicates that the flip-flop 45 is off and the flip-flop 43 is on.

If both Occupancy flip-flops 43 and 45 are "on" indicating that the A and B registers are full, or if the flip-flop 43 alone is "on" indicating the A-register is full, the central control unit 20 is allowed to advance from the $S_2$ state to the $S_3$ state in normal manner. In order for an operand to be inserted in the top of the stack, the contents of the A-register must be first transferred to the B-register and, if the B-register is also full, its contents must be transferred to the memory, i.e., the stack must, in effect, be pushed down. The $S_3$ line is applied to a "logical and" gate 149 together with output 1 of the decoder 51. Thus, only if both the A-register 42 and B-register 44 are full is an output derived from the gate 149, designated $S_{3a}$.

Assuming for the moment that both the registers 42 and 44 are full, when the central control counter advances to the $S_3$ state, the contents of the Stack counter 46 are transferred to the Address register 12 through a gate 48 which is biased open by applying the $S_{3a}$ level through a "logical or" circuit 50 to the gate 48. The Stack counter 46 is arranged as a shift register, DP's being applied to a gate 52 to the shifting input of the Stack counter 46 during the $S_3$ state by applying the $S_{3a}$ level to the gate 52 through a "logical or" circuit 54. DP's are also applied to shift the Address register 12 by applying the $S_{3a}$ level to the "logical or" circuit 28 to bias open the gate 26. At the termination of the $S_3$ state, and SP is generated and applied to the "count up" input of the Stack counter 46 through a gate 56, which is biased open during the $S_{3a}$ state.

Also during the $S_{3a}$ state, the contents of the B-register 44 are transferred to the Memory register 14. To this end, a gate 58 is biased open during the $S_{3a}$ state and DP's are applied to the shift input of the B-register 44 through a gate 60 biased open by applying the $S_3$ level through a "logical or" circuit 62 to the gate 60. The gate 34 is also open during the $S_{3a}$ state to apply DP's to the shift input of the Memory register 14. A gate 64 is biased open during the $S_3$ state permitting transfer from the A-register 42 to the B-register 44 through a "logical or" circuit 66. DP's are applied to the shift input of the A-register 42 through a gate 68 which is biased open by applying the $S_3$ level through a "logical or" circuit 70 to the gate 68.

After the required number of DP's are generated during the $S_3$ state to shift the contents of the A-register 42 into the B-register 44 and shift the contents of the B-register 44 into Memory register 14, a memory "Write" operation is initiated by an SP applied to the "Write" input of the core memory 10 through a gate 72.

It will be appreciated from the above description that if the B-register 44 is empty and the A-register 42 is full, the $S_{3a}$ output is not generated and only the $S_3$ level is used. This results only in the contents of the A-register 42 being shifted to the B-register 44. In either event, the A-register is left empty at the end of the $S_3$ operation. This is evidenced by the Occupancy flip-flop 43 being turned off by the shifting pulses at the output of the gate 68.

Continuing with the assumption that a Value Call syllable is stored in the Program register 18, the central control unit 20 at the end of the $S_3$ state advances to the $S_4$ state during which the address portion of the Value Call syllable is transferred to the Address register 12 for addressing the core memory 10. To this end, during the $S_4$ state, a gate 74 is biased open, permitting the flow of information from the Program register 18 through the "logical or" circuit 24 to the Address register 12. DP's are applied through the gate 26 to the shift input of the Address register 12 and through the gate 36 to the shift input of the program register 18. At the same time, the syllable is recirculated back through the input of the Program register 18, so that the syllable remains in the register. When an SP is generated at the end of the $S_4$ state, it is applied through the gate 29 to the "Read" input of the core memory 10, causing the contents of the addressed memory location to be transferred into the Memory register 14. At the same time, the central control unit 20 is advanced to the $S_5$ state.

During the $S_5$ state, the operand which is now in the Memory register 14 is transferred into the top of the stack, namely, the A-register 42. To this end, a gate 76 is biased open by applying the $S_5$ state thereto through a "logical or" circuit 78. At the same time, DP's are applied to the shift input of the A-register 42 by biasing open the gate 68 and DP's are applied to the shift input of the Memory register 14 by biasing open the gate 34. Also, a gate 79 on the output of the Memory register is biased open. At the completion of the $S_5$ state, a word has been transferred from a specified address location into the A-register.

If the A-register 42 is empty at the time a Value Call syllable is encountered, the $S_3$ state can be passed over and the central control unit 20 can be set immediately to the $S_4$ state. This is accomplished by means of a "logical and" circuit 53, the output of which controls a gate 55. The "logical and" circuit 53 senses that the Occupancy flip-flop 43 is off, indicating that the A-register 42 is empty. It also senses that a Value Call syllable is stored in the Program register 18 and it also senses that the central control unit is in the $S_2$ state. If all these conditions are true, the gate 55 is biased open and the central control unit is set directly to the $S_4$ state, thus bypassing the $S_3$ state. Operation then continues as described above with the addressing of the core memory and the loading of the A-register 42. At the end of the $S_5$ state, the central control unit automatically returns to the $S_1$ to fetch the next program syllable.

The next program syllable placed in the Program register 18 may be another Value Call syllable, in which case the operation continues in identical fashion to that described above, or it may be an Operator syllable. Most operators are binary operators which require two operands such as, for example, Add, Subtract, and the like. Binary operators operate on the contents of both the A-register 42 and B-register 44 and therefore require that both of these registers be full before execution.

Consider first the case where an operator syllable has been placed in the Program register 18 at a time when both the A-register 42 and B-register 44 are empty and the associated Occupancy flip-flops 43 and 45 are therefore off. This requires that before execution of the Operator syllable, the stack must in effect be moved up twice to load the A-register and B-register with the two operands last placed in the stack. If either the A-register 42 or the B-register 44 is full and the other register is empty, the stack still must be moved up once in order to fill both of the resistors. Only if the A-register 42 and B-register 44 are both full does the central control 20 advance from the $S_2$ state to the states required to execute the particular Operator syllable.

Assuming one or the other or both of the registers 42 and 44 is empty, the central control unit 20 is advanced from the $S_2$ state directly to the $S_6$ state. To this end, the SP generated at the end of the $S_2$ state is applied to the central control unit through a gate 80 which is controlled by a "logical and" circuit 82. The "logical and" circuit senses that one or the other of the registers 42 and 44 is empty by means of the output 1 from the decoder 51 which is applied through an inverter 84 to the "logical and" circuit 82. The "logical and" circuit 82 also senses that the $S_2$ state has been reached in the central control unit 20 and that the syllable in the Program register 18 is an Operator syllable. The type of syllable is identified by certain of the bits in the syllable stored in the Program register 18.

During the $S_6$ state, the Stack counter 46 is first counted down by applying the $S_6$ state to a gate 86 which passes the SP generated at the end of the $S_6$ state to the Count Down input of the Stack counter 46. The central control unit 20 then automatically advances to the $S_7$ state.

During the $S_7$ state, the contents of the Stack counter 46 are transferred to the Address register 12 by biasing open the gate 52 for applying shifting pulses to the Stack counter 46, biasing open the gate 48, and biasing open the gate 26 to apply shifting pulses to the Address register 12. The SP at the end of the $S_7$ state is passed by the gate 29 to the Read input on the core memory 10 resulting in the last operand placed in the core memory 10 being read out again into the Memory register 14.

If the B-register 44 is full and the A-register 42 is empty, during the $S_7$ state the contents of the B-register 44 is transferred to the A-register 42. To this end, the $S_7$ state is applied to a "logical and" circuit 88 along with the output 2 from the decoder 51. The output of the "logical and" circuit 88, referred to as the $S_{7a}$ state, is applied to the gate 60 through the "logical or" circuit 62 to apply shifting pulses to the B-register 44. It is also applied by a gate 90 to the input of the arithmetic unit 92, the output of the arithmetic unit 92 being applied through a "logical or" circuit 94 back to the gate 76 on the input of the A-register 42. The gate 76 is biased open during the $S_{7a}$ state, as is the gate 68. Thus, at the end of the $S_{7a}$ state, the contents of the B-register 44 are transferred to the A-register 42. The arithmetic unit 92 has no effect on this operation.

At the end of the $S_7$ state, the central control unit 20 advances to the $S_8$ state, during which state the contents of the Memory register 14 are transferred to the B-register 44. To this end, the $S_8$ state is applied to the gate 34 to pass shifting pulses to the Memory register 14, also to the gate 79 and to the gate 64 of the input of the B-register 44 as well as the gate 60 for applying shifting pulses to the B-register 44. If, at the end of the $S_8$ state, both the A-register 42 and B-register 44 are full, as evidenced by the Occupancy flip-flops 43 and 45, the central control unit 20 advances through the states required to execute the particular program syllable in the register 18. If both registers are not full at the end of the $S_8$ state, the gate 80 is again biased open and the SP resets the central control unit to the $S_6$ state. To this end, the "logical and" circuit 82 is arranged to respond either to the $S_2$ state or the $S_8$ state along with the other conditions described above by applying $S_2$ and $S_8$ to the "logical and" gate 82 through a "logical or" circuit 96. The above described operation is now repeated, resulting in both the registers 42 and 44 being filled at the completion of the second pass through the $S_6$, $S_7$ and $S_8$ states of the central control unit 20.

From the above description, it will be recognized that the Occupancy flip-flops 43 and 45 in combination with the A-register 42 and B-register 44 respectively provide a means for controlling a stack-type temporary storage facility. Use of these flip-flops very significantly reduces the operating time of the computer since, in many cases, an adjustment of the stack can be avoided in executing a sequence of program syllables. In the absence of the occupancy flip-flops, the stack would have to be automatically adjusted at the end of the execution of each syllable to insure that the stack was always in the same condition at the start of the execution of the next Program syllable.

What is claimed is:

1. A digital computer comprising first and second registers, an addressable temporary storage facility for storing a group of words in an address sequence identifying the order in which they are received, means associated with the first register for generating a signal indicating whether or not the first register is full of usable information, means associated with the second register for generating a signal indicating whether or not the second register is full of usable information, means responsive to the signals from said first and second signal generating means when the registers are both full for performing an arithmetic operation on the contents of the first and second registers and placing the result back in one of said registers, means responsive to the signals from the first and second signal generating means when indicating that the first register is full and the second register is empty for transferring the last word in the addressable sequence in the temporary storage facility to the second register, means responsive to the signals from the first and second signal generating means when indicating that the first register is empty and the second register is full for transferring the contents of the second register to the first register and transferring the last word in the addressable sequence in the temporary storage facility to the second register, and means responsive to the signals from the first and second signal generating means when indicating that both registers are empty for transferring the last word in the addressable sequence in the temporary storage facility to the first register and transferring the next to last word in the addressable sequence in the temporary storage facility to the second register.

2. A digital computer comprising first and second registers, an addressable temporary storage facility for storing a group of words in an address sequence identifying the order in which they are received, means associated with the first register for generating a signal indicating whether or not the first register is full of usable information, means associated with the second register for generating a signal indicating whether or not the second register is full of usable information, means responsive to the signals from the first and second signal generating means when indicating that the first register is full and the second register is empty for transferring the last word in the addressable sequence in the temporary storage facility to the second register, means responsive to the signals from the first and second signal generating means when indicating that the first register is empty and the second register is full for transferring the contents of the second register to the first register and transferring the last word in the addressable sequence in the temporary storage facility to the second register, and means responsive to the signals from the first and second signal generating means when indicating that both registers are empty for transferring the last word in addressable sequence in the temporary storage facility to the first register and transferring the next to last word in the addressable sequence in the temporary storage facility to the second register.

3. In a computer having a temporary storage facility including a pair of registers and an addressable memory device, and wherein arithmetic operations are performed on the contents of the registers with the result of such operations being stored in one of the registers, control apparatus comprising a first binary element associated with a first one of said registers, a second binary element associated with a second one of said registers, means setting the first binary element to one stable state in response to the transfer of a word into the first register and setting the first binary element to the other stable state in response to the transfer of a word out of the first register, means setting the second binary element to one stable state in response to the transfer of a word into the second register and setting the second binary element to the other stable state in response to the transfer of a word out of the second register, means for addressing the memory device in a predetermined sequence, and means responsive to said first and second bistable elements at the start of an arithmetic operation for automatically filling the registers from the memory device when the bistable elements indicate either of the registers is empty, said means responsive to said first and second bistable elements including means responsive to the addressing means for selecting the last words stored in the memory device in accordance with said predetermined sequence.

4. In a computer having a stack memory unit including first and second registers and an addressable storage facility, and stack control means controlling the transfer of words between the first and second registers and the addressable storage facility such that information flowing in one direction in the stack unit is from the first register to the second register then to the addressable locations in the storage facility in ascending sequence and, in the other direction, from addressable locations in descending sequence to the second register then to first register, the improvement comprising first means for indicating when the first register contains a usable word of information, second means for indicating when the second register contains a usable word of information, first control means for effecting transfer of a word into the stack memory unit including means responsive to the first indicating means for automatically activating the stack control means to clear the first register when the first indicating means indicates that the first register contains usable information and second control means for effecting an operation requiring words in both registers including means responsive to the first and second indicating means for automatically activating the stack control means to load the two registers when said first and second indicating means indicates that either the first or second registers contain no usable information.

5. A digital processor comprising first and second registers for storing groups of digits in electrically coded form, means for generating signals indicating whether or not the respective registers contain usable groups of digits, addressable storage means for storing a plurality of groups of digits, means coupled to the said registers for utilizing the contents of registers to perform arithmetic operations, means for initiating an arithmetic operation including means responsive to said signal generating means for automatically loading the registers from the storage means when the signal generating means indicates that one or both registers does not contain usable groups of digits.

6. A digital processor comprising first and second registers for storing groups of digits in electrically coded form, means for generating signals indicating whether or not the respective registers contain usable groups of digits, addressable storage means for storing a plurality of groups of digits, means for loading the first register on command including means responsive to the signal generating means for automatically transferring the contents of the first register to the second register when the signal generating means indicates that the first register contains a usable group of digits, and means responsive to the signal generating means for automatically transferring the contents of the second register to the storage means when the signal generating means indicates that the second register contains a usable group of digits.

7. An internally programmed digital processor for executing a series of command program syllables comprising first and second registers for storing digitally coded words, means responsive to the transfer of words into and out of the registers for generating signals indicating that the registers are full or empty, means for storing a plurality of digitally coded words in addressable storage locations, means for controlling transfer of words into the storage locations in a predetermined sequence of address locations and controlling transfer of the same words out of the storage locations in the reverse sequence of address locations, and means responsive to a command syllable utilizing the words of both registers in the execution of the command syllable and controlled by the signal generating means for activating said means controlling the transfer of words to load the registers from the storing means when the signal generating means indicates one or both of the registers are empty.

8. An internally programmed digital processor for executing a series of command program syllables comprising first and second registers for storing digitally coded words, means responsive to the transfer of words into and out of the registers for generating signals indicating that the registers are full or empty, means for storing a plurality of digitally coded words in addressable storage locations, means for controlling transfer of words into the storage location in a predetermined sequence of address locations and controlling transfer of the same words out of the storage location in the reverse sequence of address locations, and means responsive to a command syllable that transfers a new word to one of the registers for activating said means controlling the transfer of words when the signal generating means indicates both registers are full to initiate a transfer of the word in the first register to the second register and the word in the second register to the storing means.

9. In a digital processor, the combination comprising a register for storing a digitally coded word, means for storing a plurality of words in addressable storage locations, means associated with the register for generating a signal indicating that the register is full or empty, means operable on command for utilizing the word in the register, said means including means responsive to the signal generating means for automatically loading the register from the addressable storage means when the signal generating means indicates the register is empty, and means operable on command for placing a new word in the register, said means including means responsive to the signal generating means for automatically transferring the old word in the register to the storage means when the signal generating means indicates the register is full.

References Cited by the Examiner

UNITED STATES PATENTS

| | | | |
|---|---|---|---|
| 3,018,959 | 1/1962 | Thomas | 340—172.5 |
| 3,047,228 | 7/1962 | Bauer et al. | 235—157 |
| 3,056,110 | 9/1962 | Cypser et al. | 340—172.5 |
| 3,099,819 | 1/1963 | Barnes | 340—172.5 |
| 3,107,292 | 10/1963 | Daly et al. | 235—61.7 |

ROBERT C. BAILEY, *Primary Examiner.*

MALCOLM A. MORRISON, *Examiner.*

R. M. RICKERT, *Assistant Examiner.*